US009305254B2

(12) United States Patent
Bosquet et al.

(10) Patent No.: US 9,305,254 B2
(45) Date of Patent: Apr. 5, 2016

(54) METHOD OF MANUFACTURING A CARD OF SMALL THICKNESS DETACHABLE FROM A PLATE OF LARGE THICKNESS

(71) Applicants: Olivier Bosquet, Vitre (FR); Gregory Simonneaux, Servon sur Vilaine (FR)

(72) Inventors: Olivier Bosquet, Vitre (FR); Gregory Simonneaux, Servon sur Vilaine (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/368,835

(22) PCT Filed: Dec. 21, 2012

(86) PCT No.: PCT/FR2012/053057
§ 371 (c)(1),
(2) Date: Jun. 26, 2014

(87) PCT Pub. No.: WO2013/098518
PCT Pub. Date: Jul. 4, 2013

(65) Prior Publication Data
US 2014/0353388 A1    Dec. 4, 2014

(30) Foreign Application Priority Data
Dec. 29, 2011    (FR) ...................................... 1162522

(51) Int. Cl.
*G06K 19/077*    (2006.01)
(52) U.S. Cl.
CPC ...... *G06K 19/0772* (2013.01); *G06K 19/07739* (2013.01); *Y10T 29/49002* (2015.01); *Y10T 83/0481* (2015.04)

(58) Field of Classification Search
CPC .................................................. G06K 19/07745
USPC ................................................... 235/492, 487
See application file for complete search history.

(56) References Cited

U.S. PATENT DOCUMENTS

| 6,685,097 B1* | 2/2004 | Housse ........................ 235/492 |
| 8,950,681 B2* | 2/2015 | Lepp et al. .................... 235/492 |
| 2006/0226238 A1* | 10/2006 | Salib et al. ................... 235/492 |

FOREIGN PATENT DOCUMENTS

| DE | 199 06 570 | 8/2000 |
| WO | 00/49567 | 8/2000 |
| WO | 02/066226 | 8/2002 |

OTHER PUBLICATIONS

International Search Report dated Mar. 6, 2013, in corresponding PCT application.

* cited by examiner

*Primary Examiner* — Allyson Trail
(74) *Attorney, Agent, or Firm* — Young & Thompson

(57) ABSTRACT

A method of manufacturing a card (3) of small format (8) and small thickness (5), detachable from a plate (1) of large thickness (6), includes the following steps: providing in the plate (1) of large thickness (6) at least one hole (4) opposite with a cumulative depth (7) equal to the difference between the large thickness (6) and the small thickness (5), pre-cutting of the card (3) of small format (8) in the at least one hole (4). The product obtained by such a method is also described.

20 Claims, 3 Drawing Sheets

METHOD OF MANUFACTURING A CARD OF SMALL THICKNESS DETACHABLE FROM A PLATE OF LARGE THICKNESS

The present invention relates to the field of cards, such as microcircuit cards, and to the manufacture of said cards.

Microcircuit cards are used in various fields, such as in banking as debit or credit cards, to verify an individual's identity when producing identity documents or even in mobile telephony as telephone subscriber cards or SIM cards.

In these fields card thickness has remained the same since microcircuit cards were first invented and standardized.

Particularly in the field of telephony, microcircuit cards or SIM cards have seen their format shrink with decreasing terminal size.

Thus, the first cards had a substantially rectangular ID1 format measuring 54×85.6 mm for a thickness of 0.76±0.08 mm. This format was then replaced by a smaller 2FF format measuring 15×25 mm for the same thickness. An even smaller 3FF format has recently been created, measuring 12×15 mm again for an identical thickness.

A problem has arisen with a new smaller 4FF format measuring 8.8×12.3 mm, in which the thickness has been decreased and must be equal to 0.65+0.03/−0.07 mm.

It will be noted that the overlap of the two thickness ranges, namely [0.68, 0.70] has a width of 20 μm, which is too small to envision producing a carrier meeting, in terms of thickness, both formats.

It is usual practice to produce a detachable card in an ID1 format carrier of large thickness 0.76±0.08 mm. It would be advantageous to be able to continue to use existing carriers and above all the many existing manufacturing means and tools, including in production of the new 4FF cards.

In addition, the various aforementioned formats will coexist, and it would be advantageous to produce at least one format adapter allowing the new 4FF format to be converted to old formats: 3FF, 2FF, 1FF, ID1. Such an adapter has an external format similar to one of the old formats. Here again, in practice, one or more such adapters are arranged, conjointly with a card, in a given carrier of ID1 format. Such an adapter necessarily has a large thickness.

The problem addressed by the present invention is that of manufacturing a card of small thickness in a carrier of large thickness.

One subject of the invention is a process for manufacturing a card of small format and of small thickness, which card is detachable from a carrier of large thickness, comprising the following steps: producing, facing, in the carrier of large thickness, at least one hole of cumulative depth equal to the difference between the large thickness and the small thickness; and precutting the card of small format, the card being inscribed in said at least one hole.

According to another feature of the invention, the process furthermore comprises a step of precutting an adapter of large format.

According to another feature of the invention, the adapter circumscribes the card.

According to another feature of the invention, the adapter circumscribes the hole.

According to another feature of the invention, an adapter is arranged beside the card.

According to another feature of the invention, a hole is produced by stamping the carrier by means of a punch that is complementary to said hole.

According to another feature of the invention, a hole is produced by molding the carrier, by means of a mold comprising a shape that is complementary to said hole.

According to another feature of the invention, a hole is produced by machining the carrier.

According to another feature of the invention, a precutting step comprises cutting partially lengthwise and completely thicknesswise.

According to another feature of the invention, a precutting step comprises cutting completely lengthwise and partially thicknesswise.

According to another feature of the invention, the card is a microcircuit card comprising a contact plate arranged on one of its sides, and the producing step produces a hole on the side opposite the contact plate.

According to another feature of the invention, the producing step produces a hole on the same side as the contact plate.

The invention also relates to a product obtained by the process as claimed in any one of the preceding claims.

Other features, details and advantages of the invention will become more clearly apparent from the detailed description given below by way of indication and with regard to the drawings in which.

Figure 1:
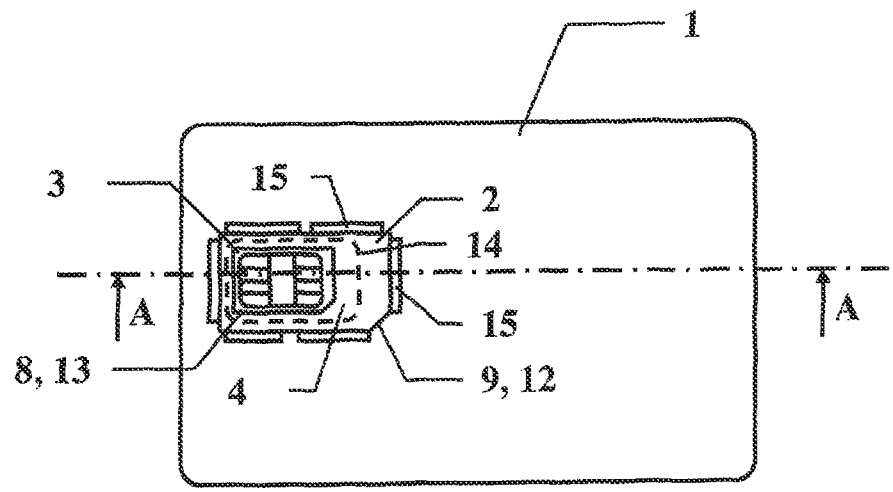
FIG. 1 shows a front view of one embodiment of a card and of an adapter in a carrier.

FIG. 1 shows one embodiment of a product according to the invention. Such a product comprises a thin carrier 1. The term "thin" is understood here to mean that the thickness of the carrier is negligible relative to its other dimensions. Said carrier 1 is rectangular for example, and is large enough to be manipulated by hand. Conventional dimensions are those of the ID1 format: 54×85.6 mm. This format is for example standardized by ISO 7816.

A card 3 is arranged in such a carrier 1. The card 3 is for example a microcircuit card. This card 3 is a card conforming to a small format 8. This card 3 is detachable, without tools, from the carrier 1 because of the presence of a precut produced along an external outline 13 of said card 3.

Figure 2:
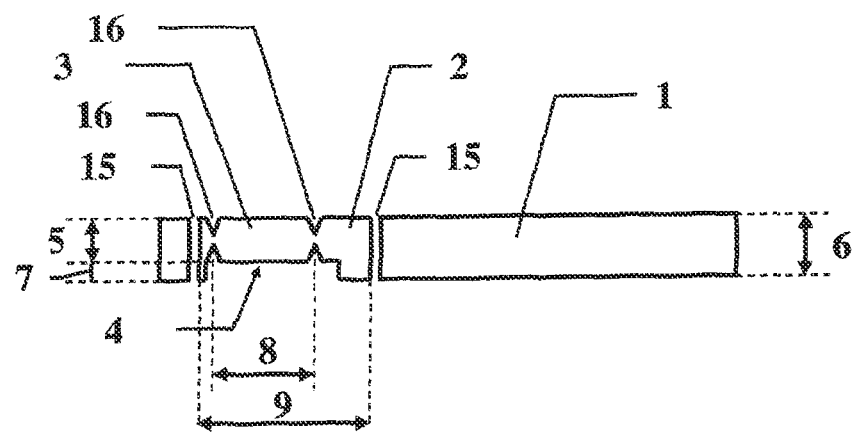
FIG. 2 shows, in cross-section along A-A, the embodiment in FIG. 1.
Figure 3:
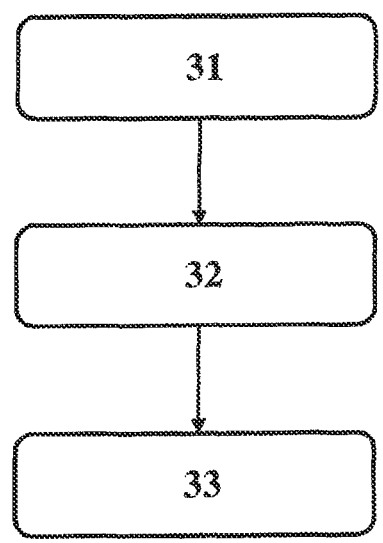
FIG. 3 shows a flow chart of the process.

Furthermore, an adapter 2 is advantageously arranged in such a carrier 1. Such an adapter 2 may be arranged in a specific carrier different from the carrier 1 containing the card 3. It may also be arranged in the same carrier 1, beside the card 3. It may even, as illustrated in FIGS. 1 and 2, be arranged in the same carrier 1, around the card 3.

Specifically, such an adapter 2 conforms to a large format 9. It comprises an external outline 12 and an internal outline of the same shape and complementary to the external outline 13 of the card 3. Furthermore, according to the embodiment illustrated in FIGS. 1 and 2, the adapter 2 is advantageously arranged around the card 3. Such an arrangement is advantageous in that it makes it possible to occupy only a minimum area of the carrier 1.

Thus it is even possible to arrange an adapter 2 around the card 3 and at least one other adapter beside the card 3 in the same carrier 1. A given carrier 1 may thus advantageously serve as a medium for distributing together a card 3, an adapter to a first large format and, if needs be, at least one second adapter to a second large format.

According to one particularity addressed by the invention, the card 3 has a small thickness 5, which is smaller than a large thickness both of the carrier 1 and of the one or more adapters 2.

Manufacture of the card 3, of the material carrier 1, and, if needs be, of the at least one adapter 2, is advantageous and may be obtained by a process that will now be described.

Figure 4:
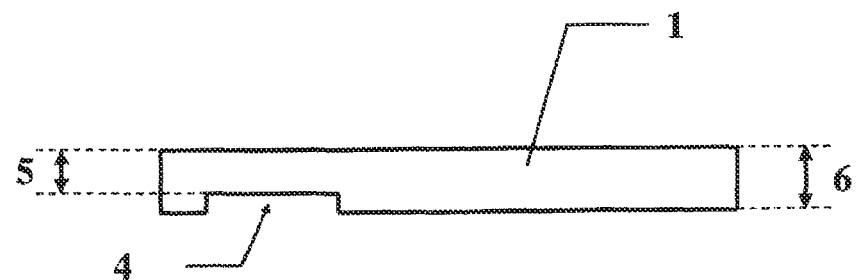
FIG. 4 shows an intermediate product.

Such a process comprises a first step 31 consisting in producing a first intermediate product, illustrated in FIG. 4, which shows a cross-sectional view, along an axis A-A, comparable to the view in FIG. 2. In this first step 31 at least one hole 4 is produced in a carrier 1 of substantially constant thickness equal to a large thickness 6.

It is possible to produce a single hole 4. In this case, this hole 4 may be arranged on either side of the carrier 1. The depth 7 of such a single hole 4 is equal to the difference between the large thickness 6 of the carrier 1 and the small thickness 5 of the card 5. Thus, in line with the hole 4, which creates a decrease of depth 7 relative to a large thickness 6, a residual thickness equal to a small thickness 5 remains.

It is also possible to produce a hole 4 on both sides of the carrier 1. In this case, these two holes 4 are arranged facing each other. They advantageously have substantially similar hole outlines, which are advantageously superposed. The cumulative depth of two such holes 4, i.e. the depth of a first hole added to the depth of a second hole, is equal to the difference between the large thickness 6 of the carrier 1 and the small thickness 5 of the card 5. Thus, in line with the two holes 4, which create a decrease relative to a large thickness 6, a residual thickness equal to a small thickness 5 remains.

In the following, the two hole outlines will be considered to be substantially similar i.e. to follow a single hole outline 14.

In a second step 32, the card 3 of small format 8 is precut. The precut produced follows an external outline 13 of the card 3.

Since the card 3 must have a thickness equal to the small thickness 5 over the entirety of its area, said precut is advantageously inscribed in said hole 4. In other words, the external outline 13 of the card 3 is inscribed in the outline 14 of the hole 5. The term "inscribed" here includes equaling: the external outline 13 of the card 3 may be coincident with the outline 14 of the hole. Thus, when the card 3 is detached by breaking said precut and extracted from the carrier 1, it has, over its entire area, a thickness equal to the small thickness 5.

The small format of the card 3 may be any shape and size. According to one preferred embodiment, it may be a 4FF format defined by an external outline 13 measuring 8.8×12.3 mm and having a small thickness of 0.65+0.03/−0.07 mm.

In a third step 33, which is optional insofar as it allows an optional adapter 2 to be produced, an adapter of large format 9 is precut. In this step, an external outline 12 of the adapter 2, which corresponds to the large format 9, is precut. A second precutting operation is also carried out along an internal outline of the adapter 2. This second precutting operation is indistinguishable from the preceding step 32 when the adapter 2 is arranged around the card 3. It must be carried out independently if not.

The large format of the adapter 2 may be any shape and size. According to a preferred embodiment, it may be a 3FF format defined by an external outline 12 measuring 12×15 mm and a large thickness of 0.76±0.08 mm and/or a 2FF format defined by an external outline 12 measuring 15×25 mm and a large thickness of 0.76±0.08 mm.

As mentioned above, an adapter 2 may advantageously be arranged around the card 3, in a relative position corresponding to its final position of use. Such an adapter 2 then circumscribes the card 3. In other words, the external outline 12 of the adapter 2 circumscribes the external outline 13 of the card 3.

An adapter may even, alternatively or additionally, be arranged beside the card 3 in a given carrier 1.

In the case where the adapter 2 is arranged around the card 3, it will advantageously have a thickness equal to the large thickness 6. This is necessary if it is to be possible to insert and use said adapter 2 sustainedly in a card reader designed for the large format 9. This constraint is satisfied if preset portions of the area of the adapter 2 have this large thickness 6. A card reader typically comprises lateral slides that cover at least one portion of the external outline 12 of the large format 9. Therefore, the adapter 2 advantageously has a large thickness 6 at least over the corresponding portion of its external outline 12. One means of satisfying this constraint is for the adapter 2 to circumscribe the hole 4. In other words, it is advantageous for the external outline 12 of the adapter 2 to circumscribe the external outline 14 of the hole 4. Since, as mentioned above, it is advantageous for the adapter 2 to have a thickness equal to the large thickness 6 over at least one portion of its area, this circumscription is here understood strictly to mean: the external outline 12 of the adapter 2 cannot be equal to the external outline 14 of the hole.

It will be noted that this constraint does not apply when an adapter is arranged beside the card 3. This is because in this case the thickness of the adapter 2 is constant over its entire area and equal to the large thickness 6.

The two first steps 31 and 32 or the three steps 31, 32 and 33 of the process are presented in an arbitrary order. However, it is important to note that these steps may be carried out in different orders. The step 32 of precutting the card 3 may be carried out before the step 31 of producing the hole, especially in the case of partial lengthwise precut (described in greater detail below). Depending on the embodiment, these two steps may be carried out at the same time. The step 33 of precutting the adapter 2 may be carried out before, during or after either one of the two steps 31 and 32.

The step 31 of the process that results in the intermediate product illustrated in FIG. 4, produces at least one hole 4 in a carrier 1 of large thickness 6. To do this, a number of different production methods may be used.

Figure 5:
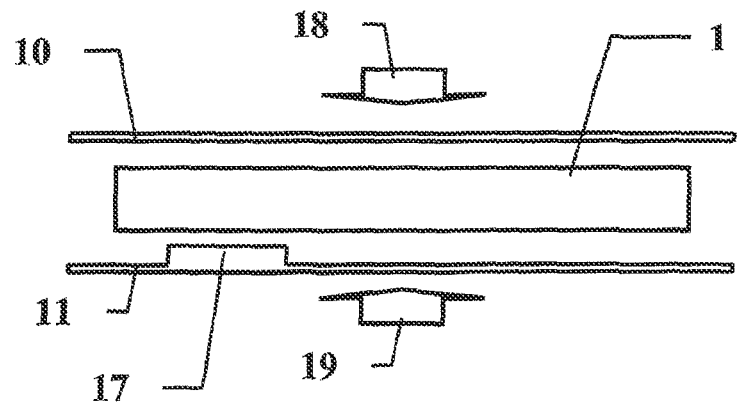
FIG. 5 illustrates one method of producing a hole by pressing.

In a first production method, illustrated in FIG. 5, the carrier 1 is produced by pressing. The carrier 1 which is made up of one or more layers of material, for example one or more layers of plastics such as polycarbonate, is pressed between two complementary tools 10-11. These tools 10-11 may be flat tools employed in a press or even rollers between which the carrier 1 is pressed as said rollers rotate. As is known, these two tools 10-11 press between them the components of a carrier 1 by moving towards each other in the directions shown by the arrows 18 and 19. If needs be, this pressing operation may be carried out at a high temperature.

It is known to use two smooth tools, similar to the tool 10, to produce a carrier 1 of uniform thickness. In contrast, according to the invention, at least one of the tools 10-11, here the tool 11, is equipped with a solid protruding punch 17 of complementary shape to the recessed shape that is desired for the hole 4. In the pressing operation, this punch 17 is used to emboss the carrier 1 and thus form a hole 4. It will be noted here that this stamping step is carried out conjointly with a pressing step that produces the carrier 1. Said at least one hole 4 is thus integrated into the carrier 1 during its manufacture.

Figure 7:
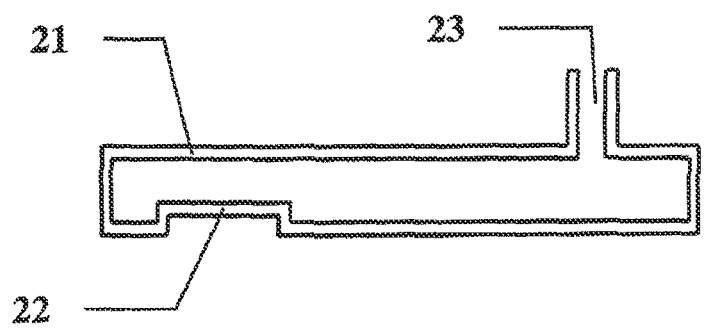
FIG. 7 illustrates one method of producing a hole by machining.

According to another production method, illustrated in FIG. 7, the carrier 1 and the hole 4 are produced by molding. The carrier 1 is here produced by means of a mold 21. Said mold 21 has a shape that is complementary to the carrier 1 equipped with at least one hole 4, such as illustrated in FIG. 4. Said mold 21 comprises at least one shape 22 projecting toward the interior of the mold 21, which shape is solid and complementary to the recessed shape that is desired for a hole 4. The constituent material of the carrier 1 is injected in liquid form via an injection duct 23. Post-solidification, at least one hole 4 is integrated into the carrier 1 obtained.

Figure 6:
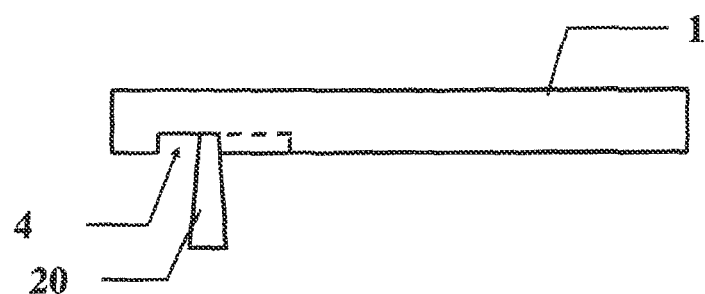
FIG. 6 illustrates one method of producing a hole by molding.

According to another production method, illustrated in FIG. 6, a hole 4 is produced by machining. In this production method, the carrier 1 is produced beforehand by any means, such as pressing, molding, machining, etc., with a uniform thickness equal to the large thickness 6. Excess material is then removed in line with at least one hole 4 by means of a tool 20. Said machining may be mechanical, for example by means of a milling cutter 20. It may also be thermal by means of a laser tool 20 or even chemical by means of a solvent.

Whatever the production method used in the step 31 of producing at least one hole 4, the carrier 1 obtained contains at least one hole 4, an indicative shape of which is illustrated in FIG. 4 for an embodiment containing a single hole 4.

The step 32 of precutting a card 3 and/or the step 33 of precutting an adapter 2 may be carried out on this shape. A precut may be produced according to at least two embodiments, which may be employed separately or together.

The objective of a precut is to allow two elements to remain fastened together until said two elements are separated by breaking the residual portion of the precut. Thus, the function of a precut is to weaken a separating boundary line in order to make it possible to break it with little effort and preferably without needing to use a tool. A precut is a partial cut.

According to a first method of implementation, a precut, whether this is the precut of the external outline 13 of the card 3 or the precut of the external outline 12 of the adapter 2, comprises a cut that is partial lengthwise and complete thicknesswise. Along the precutting outline 12, 13 the carrier 1 is cut right through its thickness. However, this cut does not extend over the entirety of the length of said outline 12, 13 and bridges of material remain between two successive cuts 15. Such partial lengthwise cutting is also referred to as slitting.

According to a second method of implementation, a precut comprises a cut that is complete lengthwise and partial thicknesswise. Along the precutting outline 12, 13 the carrier 1 is cut over the entirety of the length of said outline 12, 13. However, this cut does not pass right through the thickness of the carrier 1 and a residual thickness remains.

It is possible to combine these two embodiments. A partial lengthwise precutting operation is carried out, and a partial thicknesswise precutting operation is performed on the bridge portions of the outline 12, 13.

In order to illustrate these two embodiments, FIGS. 1 and 2 show an example embodiment in which the first partial lengthwise embodiment has been used to produce the precut 33 of the adapter 2, and the second partial thicknesswise embodiment has been used to produce the precut 32 of the card 3.

Thus it may be seen that the outline 12 of the adapter 2 is cut partially lengthwise but right through the thickness 6 of the carrier 1 by cuts 15, here six in number. Between these cuts 15, which are typically produced by means of a punch, bridges of material remain, which bridges ensure the adapter 2 remains fastened to the carrier 1. The adapter 2 is separated from the carrier 1 by breaking these bridges.

In contrast, the outline 13 of the card 3 is cut, partially thicknesswise but over the entirety of the length of said outline 13, by a groove 16 on at least one of its two sides. In the example illustrated, a groove 16 has been produced on both of the two sides. These two grooves 16 advantageously face each other. They leave a residual thickness in place, which allows the card to remain fastened to the carrier 1 and/or the adapter 2. The card 3 is separated from the carrier 1 by breaking this residual thickness in line with the one or more grooves 16.

The process according to the invention, such as described above, is advantageously applied to a microcircuit card or smartcard (3). As is known, such a card (3) comprises a contact plate providing electrical interfaces to a microprocessor or chip typically arranged in the thickness of the card 3 under said contact plate. This contact plate is thus arranged in the thickness of the card 3 so as to lie flush with the surface of one of the sides of the card 3.

In order for the contact plate to also be flush relative to the surface of the side of the carrier 1, a hole 4, preferably a single hole, is advantageously produced such that it opens onto that side of the card 3 which is opposite the side of the contact plate.

However, such an arrangement is not absolutely essential and it is possible to produce a hole 4 in the same side as the side of the contact plate.

If two holes 4 are produced, a first hole is produced in the same side and a second hole is produced in the opposite side.

The invention also relates to a carrier 1 produced in this way and comprising at least one detachable card 3.

The invention claimed is:

1. A process for manufacturing a card of small format and of small thickness, which card is detachable from a carrier of a larger thickness, the process comprising the following steps:
   producing, inside the carrier of a larger thickness, at least one hole extending from a face, said at least one hole having a cumulative depth equal to the difference between a larger thickness and the small thickness; and
   precutting the card of small format, the card being inscribed in said at least one hole.

2. The process as claimed in claim 1, furthermore comprising a step of precutting an adapter of large format.

3. The process as claimed in claim 2, wherein the adapter circumscribes the card.

4. The process as claimed in claim 3, wherein the adapter circumscribes the hole.

5. The process as claimed in claim 1, wherein an adapter is arranged beside the card.

6. The process as claimed in claim 1, wherein a hole is produced by stamping the carrier by means of a punch that is complementary to said hole.

7. The process as claimed in claim 1, wherein a hole is produced by molding the carrier, by means of a mold comprising a shape that is complementary to said hole.

8. The process as claimed in claim 1, wherein a hole is produced by machining the carrier.

9. The process as claimed in claim 1, wherein a precutting step comprises cutting partially lengthwise and completely thicknesswise.

10. The process as claimed in claim 1, wherein a precutting step comprises cutting completely lengthwise and partially thicknesswise.

11. The process as claimed in claim 1, wherein the card is a microcircuit card comprising a contact plate arranged on one of its sides, and wherein the producing step produces a hole on the side opposite the contact plate.

12. The process as claimed in claim 1, wherein the card is a microcircuit card comprising a contact plate arranged on one of its sides, and wherein the producing step produces a hole on the same side as the contact plate.

13. A method for manufacturing a card having two faces delimited by a contour conforming to a first format and a first thickness between said two faces, together with a carrier having two faces delimited by an external contour conforming to a second format larger than the first format and having a second thickness between said two faces of the carrier, said second thickness being larger than the first thickness, the card being detachable from the carrier, the method comprising:

a step of producing a plate having a contour equal to the contour of the second format and having the second thickness except in an area of restricted thickness at a distance from the contour of the plate, said area of restricted thickness being determined by at least a depression from one face of the plate, the restricted thickness being equal to the first thickness and the depression having a contour at least encompassing the first format; and a step of precutting a contour conforming to the first format within the area of restricted thickness, so as to obtain, within the precut contour, the card having the first format and the first thickness while being surrounded by a remaining part of the plate forming the carrier, the card being detachable from the carrier.

14. The method of claim 13, further comprising a step of precutting in the carrier another contour conforming to a third format larger than the first format and smaller than the second format, so as to obtain a format adapter surrounding the card.

15. The method of claim 13, wherein the step of producing the plate is made so that the at least a depression has a contour conforming to the first format, so that the precut contour follows the contour of the depression.

16. The method of claim 13, wherein the step of producing is made so that two depressions are present on each face, the cumulative depth of these two depressions being equal to the difference between the second thickness and the first thickness.

17. The method of claim 13, wherein the step of producing comprises a first substep of producing a plate having the second thickness and a second substep of forming the at least depression.

18. The method of claim 13 wherein the card is a microcircuit card.

19. The method of claim 18, wherein the format of the carrier is equal to ID1 format.

20. The method of claim 13, wherein the card is a microcircuit card and the format of the carrier measures 54×85.6 mm with a thickness of 0.76±0.08 mm.

* * * * *